United States Patent [19]

Komatsubara et al.

[11] 4,336,984
[45] Jun. 29, 1982

[54] APPARATUS FOR HOLDING A COPY IN REPRODUCTION CAMERA

[75] Inventors: Shozi Komatsubara; Masanori Katayama, both of Hikone, Japan

[73] Assignee: Dainippon Screen Mfg. Co., Ltd., Kyoto, Japan

[21] Appl. No.: 139,170

[22] Filed: Apr. 11, 1980

[30] Foreign Application Priority Data

May 4, 1979 [JP] Japan .................. 54-59813[U]

[51] Int. Cl.³ ............................................. G03B 27/62
[52] U.S. Cl. ..................................................... 352/75
[58] Field of Search .................................. 355/75, 76

[56] References Cited

U.S. PATENT DOCUMENTS 1,834,897 12/1931 Caps ....................................... 355/75
1,946,810 2/1934 Rowell ................................... 355/75
2,487,623 11/1949 White ..................................... 355/76
3,996,596 12/1976 Kurtik .

FOREIGN PATENT DOCUMENTS 482708 12/1975 U.S.S.R. ................................ 355/75

Primary Examiner—Monroe H. Hayes
Attorney, Agent, or Firm—Brumbaugh, Graves, Donohue & Raymond

[57] ABSTRACT

In a reproduction camera having a slant body and anteroinferior platforms, apparatus for setting or replacing a copy comprises a carrier which is anteroinferior and capable of moving along the slant body, where the optical axis is always vertical thereto, a copy holder which is mounted on the carrier to swing back and forth around a fulcrum, and a plate for holding down evenly a copy mounted on the copy holder by a hinge, by which the plate can be opened or closed. The fulcrum is positioned so that the total centroid of the combination of the holder, the plate and the hinge exists in the rear of the fulcrum when the plate is opened and exist in the fore of the fulcrum when the plate is closed.

5 Claims, 4 Drawing Figures

APPARATUS FOR HOLDING A COPY IN REPRODUCTION CAMERA

BACKGROUND OF THE INVENTION

The invention broadly relates to a reproduction camera having a slant body and anteroinferior platforms and more, particularly relates to an apparatus for charging or replacing a copy.

In a vertical reproduction camera, taking in the range of ⅓ to 3 magnifications with a lens of 240 mm focus length, the following relations exist:

$$a = f(1+m), \quad b = f(1+(1/m)),$$

in which:

a—length between a lens and an image plane
b—length between the lens and a copy plane
f—focal length of the lens
m—magnification so that the length between the copy plane and the image plane is obtained by the equation:

$$(a+b)_{max} = 1280 \text{ mm}$$

Consequently, the height from the floor to the image plane which located on a upper platform of the vertical camera may be no less than 1500 mm high, however closely to the floor a copy holder may be equipped. It may be too high for an operator of ordinary stature to work on the image plane of the camera, for example to perform, tracing work, so he must use a stool. Considered from the point of view of the security and efficiency of the operation, it may be a problem to get on and off, particularly, in a darkroom. So, it may be desirable to use a lower step, though it is necessary to make use of a step. For this reason, a reproduction camera whose whole body is slanted forward is shown in FIG. 1. In this camera, at the inclination of almost 10° to the vertical axis, for instance, the height of the center of the image plane may be lowered by 23 mm, which is obtained by the equation:

$$1500 \times \cos 10° = 1477,$$

so that the height of the fore edge of the image plane can be lowered by almost 65 mm so that an operator can get a wide visual range and can easily perform his work on the image plane. It will be done using a lower step than in the vertical camera heretofore in use, which may be convenient for an operator.

In common to prior reproduction cameras, on the other hand, there will be a fault that a copy placed on the holder may be apt to slide or slip off, and, particularly, that the fine adjustment of a copy may be difficult on account of the anteroinferior form of the copy holder.

BRIEF SUMMARY OF THE INVENTION

It is therefore an object of the invention to provide an apparatus for setting or replacing a copy in a reproduction camera, which apparatus permits the easy change or replacement of a copy before or after the exposure operation, which permits the fine positioning of a copy, and which precisely keeps a copy vertical to the optical axis of the camera during exposure.

This object is fulfilled according to the invention by providing an apparatus which comprises a carrier being anteroinferior and capable of moving along the fore slant body, where the optical axis is always vertical thereto, a copy holder mounted on the carrier to be capable of swinging back and forth around a fulcrum, and a plate for holding down evenly a copy mounted on the copy holder by a hinge, by which the plate can be opened or closed, and which functions so that the plate and the holder are held vertical to the optical axis, in closing the plate, and that the holder is held parallel to the slant body, in opening the plate.

BRIEF DESCRIPTION OF THE DRAWINGS

The novel features which are considered characteristic of the invention are set forth with particularity in the appended claims. The invention itself, however, and additional objects and advantages thereof will best be understood from the following description of an embodiment thereof when read in connection with the accompanying drawings, in which:

FIGS. 3 and 4 are diagrammatic side elevation which illustrate moments acting on around a fulcrum during a shot and during charge or replacement of a copy.

DETAILED DESCRIPTION

CONSTRUCTION

Figure 1:
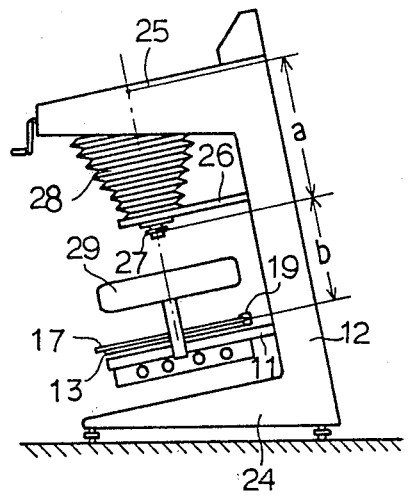
FIG. 1 is a side elevation of a reproduction camera having a fore slant body and anteroinferior platforms equipped with an apparatus for charging a copy according to the invention.
Figure 2:
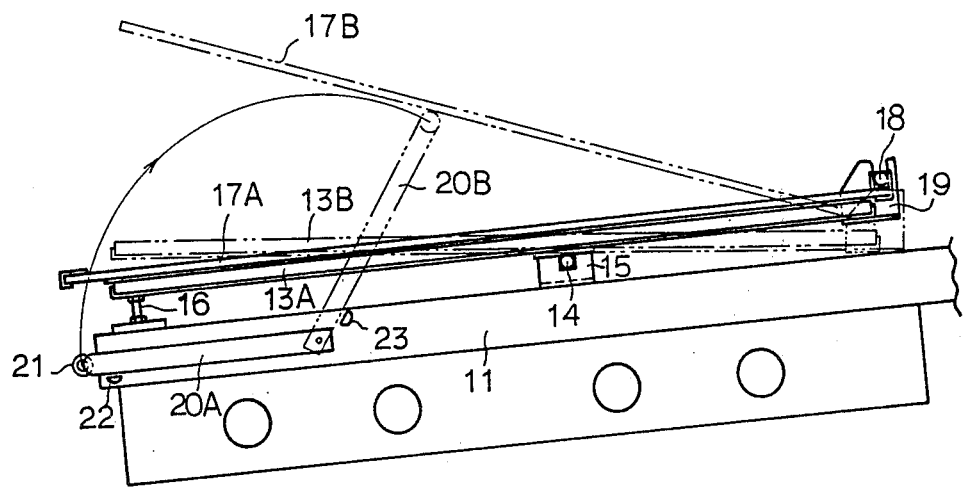
FIG. 2 is a fragmentary side elevation of the apparatus according to the invention.

Referring to FIG. 1, there is shown an external side appearance of a reproduction camera, which includes a frame having a base 24, a fore slant body 12 and an upper platform 25. An objective carrier 26 and a copy carrier 11 are respectively mounted for moving along the fore slant body 12, and are always held vertical to the optical axis. An objective lens 27 is attached to the carrier 26, and a bellows 28 is mounted between the carrier 26 and the platform 25. A plate 17 and a copy holder 13 are mounted on the carrier 11, and a copy may be inserted between them. Lamps 29 illuminate the copy. "a" and "b" set forth respectively the length between the lens 27 and the image plane and the length between the lens 27 and the copy plane. In FIG. 2, there is shown a fragmentary side elevation of the apparatus for holding a copy according to the invention. A copy holder 13 is mounted on the carrier 11 to be capable of swinging back and forth around a fulcrum which comprises an axle 14 and a bearing 15, the former fixed on the under surface of the holder and the latter fixed on the carrier 11, both of the two interconnected to form the fulcrum. Bolts 16 are mounted on the fore edge portion, i.e., on the left edge portion in FIG. 2 of the carrier, whereby the holder 13 can be adjusted to be vertical to the optical axis. A plate 17A is mounted on the holder 13, where the plate 17A is longer and wider than it, both interconnected in the rear edge portion by means of a hinge which comprises an axle 18 and its bearing 19, whereby the plate 17 is capable of opening or closing, so a copy can be placed between the holder 13 and the plate 17A. In closing the plate 17, its oven weight is evenly applied to a copy laid on the holder 13. A supporting arm 20 is attached to the side of the carrier 11 and is capable of swinging between stop pieces 22 and 23, and a contacting means 21 covered with rubber is mounted at the end to support the plate 17B. In keeping the plate 17 open, the arm 20 should be turned to the stop piece 23 to support it, and in closing the arm 20 should rest on the stop piece 22.

The position of the fulcrum is an important point concerned with the function of this apparatus. In FIG. 3, there is diagrammatically shown the condition of the apparatus during exposure, when the copy laid on the holder 13 is evenly pressed against it by means of the plate 17A. In this condition, the sum total of moments ($M_0$) acting on around the axle 14 may be obtained by the following formula:

$$W_1 \cdot d_1 + W_3 \cdot d_3 - (W_2 + W_4)d_2 - W_5 \cdot d_5 = M_0,$$

in which:
- $W_1$—weight of the left part from the axle 14 of the holder 13
- $W_2$—weight of the right part from the axle 14 of the holder 13
- $W_3$—weight of the left part from the axle 14 of the plate 17A
- $W_4$—weight of the right part from the axle 14 of the plate 17A
- $W_5$—weight of the hinge which consists of the axle 18 and its bearing 19
- $d_1, d_2, d_3, d_4, d_5$—horizontal length from the axle 14 to the centroid of above each parts; and moments acting on clockwise are dealt with as (+), moments acting on counterclockwise as (−).

Therefore, the fixating position of the axle 14 to the holder 13 should be selected to implement the inequality: $M_0 > 0$. In this way, the clockwise moment will act on the holder 13 around the axle 14, so that holder 13 may be borne at the fore edge portion of it by the bolts 16.

In charging or replacing a copy, the elements of the apparatus may be held such as imaginary lines in FIG. 2. The holder 13 is held horizontal, and the plate 17B is supported by the arm 20B which is turned arrowwise. In this condition, the whole weight of the plate 17B, i.e., ($W_3 + W_4$) may be divided to respectively apply to the arm 20B and the bearing 19. The relation among these divided weights may be set forth by the equation:

$$W_3 + W_4 = w_2' + w_2'',$$

in which:

$w_2'$—weight acting on the contacting means; and
$w_2''$—weight acting on the bearing.

Therefore, referring to FIG. 4, the sum total of the moments ($M_1$) acting on the holder 13 and the plate 17B around the axle 14 may be obtained by the equation:

$$w_1 \cdot d_1' - W_2 \cdot d_2' - (W_5 + w_2'') \, d_5' = M_1.$$

in which each terms of this equation is same as the foregoing. The fixating position of the axle 14 to the holder should be selected to implement the inequality: $M < 0$, so that the counterclockwise moment may act on the holder 13 around the axle 14. The values of "$w_2'$" and "$w_2''$" can be found by the following equations:

$$w_2' = \frac{l}{l+m} \cdot (W_3 + W_4), \quad w_2'' = \frac{m}{l+m} \cdot (W_3 + W_4).$$

in which:

- l—length along the plate 17B between the axle 18 and centroid of the plate 17B; and
- m—length along the plate 17B between the centroid and the contacting means 21.

Further, the rotary angle ($\theta$) of the holder 13 is small enough, in value of 5° to 10°, to implement the following equations approximately: $d_1' \cong d_1$, $d_2' \cong d_2$, $d_5' \cong d_5$. So, the foregoing equation:

$$W_1 \cdot d_1' - W_2 \cdot d_2' - (W_5 + w_2'') d_5' = M_1.$$

can be replaced by the following equation:

$$W_1 \cdot d_1 - W_2 \cdot d_2 - \left( W_5 + \frac{m}{l+m}(W_3 + W_4) \right) \cdot d_5 = M_1.$$

Consequently, in this apparatus, the fixating position of the axle 14 should be selected to implement the following two inequalities:

$$W_1 \cdot d_1 + W_3 \cdot d_3 - (W_2 + W_4)d_2 - W_5 \cdot d_5 > 0 \quad (A)$$

$$W_1 \cdot d_1 - W_2 \cdot d_2 - \left( W_5 + \frac{m}{l+m}(W_3 + W_4) \right) \cdot d_5 < 0 \quad (B)$$

OPERATION

When the plate 17 is closed to hold down a copy evenly, the holder 13 is held to be vertical to the optical axis, i.e., to be parallel to the carrier 11, in which the holder 13 is supported by means of the bolts 16 and the fulcrum, the bolts 16 being controlled to keep the holder 13 vertical to the optical axis, the fulcrum consisting of the axle 14 and its bearing 15. In this condition, raising the plate 17 upwards, it may be opened at the hinge by means of the upward force, and be separated from the holder 13. Synchronized with the separation of the plate 17, half of its own weight, i.e., ($W_3 + W_4/2$) may be supported by the hinge 18, 19. In this operation, the rotary moment ($M_2$) acting around the axle 14 of the hinge can be obtained by the equation:

$$W_1 \cdot d_1 - W_2 \cdot d_2 - \left( \frac{W_3 + W_4}{2} + W_5 \right) \cdot d_5 = M_2$$

Since the axle 14 is attached on the holder 13 to implement the inequality (B), and since the inequality:

$$\frac{W_3 + W_4}{2} > \frac{m}{l+m}(W_3 + W_4)$$

will be always implemented, there will be held the relation: $M_2 < 0$. Therefore, the holder 13 will be swung clockwise around the axle 14 following the plate 17. This followup function of the holder 13 may be continued till the holder 13 comes to horizontal, and stops when it contacts the carrier 11. During this operation, the holder 13 seems, as it were, to adhere to the plate 17, though only the plate 17 is raised.

After the holder 13 is horizontal, the plate 17 begins to separate from the holder 13 by further raising it, and opens upwardly. The rotary moment acting around the axle 14, during this operation, will be immutable and equal to the value ($M_2$). After raising the plate 17 to the position shown by imaginary lines in FIG. 2, it will be supported by turning the arm 20 to the stop piece 13. In this condition the charging or replacing operation is performed. As the holder 13 may receive the rotary moment ($M_1$) acting clockwise around the axle 14, it is supported by the axle 14 and its rear edge, by which it may be continuously kept horizontal. In this horizontal position of the holder 13, an operator can easily charge or replace a copy and can accurately and readily position the copy.

After charge of a copy, the holder 13 should be restored to the exposure position by operating in reverse of the foregoing. In this restoring operation, putting back the arm 20B in a horizontal position, the plate 17 is closed by lowering it. As the axle 18 receives half the weight of the plate 17, i.e., ($W_3+W_4/2$) till it is closed to the holder 13, the clockwise moment may be applied to the axle 18 during the time, hence the holder 13 is kept horizontal by which the copy placed on it never shifts or slips off. Receiving the whole weight of the plate 17 by closing it, the holder 13 may swing counter-clockwise around the axle 14 with the plate 17. Touching the top of the bolt 16, the holder 13 is fastened by applying a counterclockwise moment to it, so that it may be supported on the bolts 16 and the axle 14. Since the height of the bolts 16 is previously controlled, the holder 13 will be held parallel to the carrier 11, i.e., vertical to the optical axis of the camera. Consequently, the copy charged on the holder 13 is evenly held down by means of the plate 17 and is exactly positioned at the exposure position.

Desirably, in positioning a copy to the holder 13, it should be solid enough so as not to be even slightly moved by the application of a downward force. For this purpose, the rotary moment ($M_1$) around the axle 14 should be made as large as possible, therefore the stop piece 13 can be attached to keep the arm 20 vertical. Further, providing a ratchet gearing to the hinge 18, 19 as the supporting means, instead of the arm 20, the moment ($M_1$) can be kept at a maximum.

While the foregoing describes the preferred embodiment of the present invention and the may variations noted above may be adopted, reference is made to the claims appended hereto.

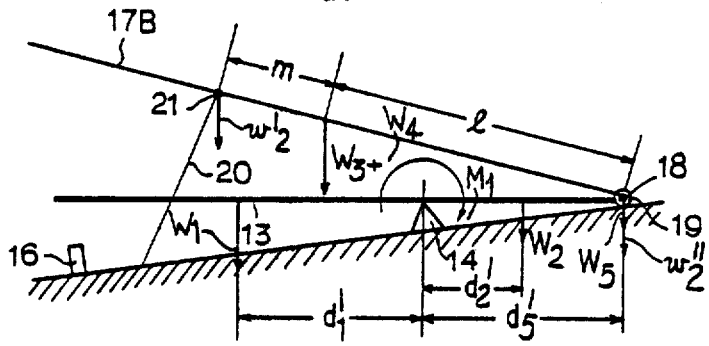

What is claimed is:

1. An apparatus for positioning a copy in a reproduction camera having an optical axis inclined from the vertical, said copy positioned in a horizontal position for set-up and in an inclined position perpendicular to said optical axis during exposure, comprising:
   carrier means mounted for axial movement along said optical axis;
   holding means mounted on said carrier means for receiving said copy;
   means for pivotally connecting said carrier means to said holding means so that said holding means pivots on said carrier means with respect to said optical axis;
   cover means mounted on said holding means for securing said copy flat against said holding means for exposure in a closed position and for permitting removal of said copy from said holding means for set-up in an open position; and
   mounting means for pivotally connecting said holding means to said cover means so that the centroid of said cover means, said holding means, and said mounting means is located between said pivotal means and said mounting means when said cover means is in said open position and opposite said mounting means and said pivotal means when said cover is in said closed position.

2. Apparatus according to claim 1 and further comprising means for positioning said cover means in said open position, said positioning means connected to said carrier means at a point such that:

$$W_1 \cdot d_1 + W_3 \cdot d_3 - (W_2 + W_4)d_2 - W_5 \cdot d_5 > 0, \text{ and}$$

$$W_1 \cdot d_1 - W_2 \cdot d_2 - \left[ W_5 + \frac{m}{l+m}(W_3 + W_4) \right] \cdot d_5 < 0,$$

where:
   $W_1$—weight of the forepart of said holding means from said pivotal means forward;
   $W_2$—weight of the rearpart of said holding means from said pivotal means rearward;
   $W_3$—weight of the forepart of said holding means from said pivotal means forward;
   $W_4$—weight of the rearpart of said cover means from said pivotal means rearward;
   $W_5$—weight of said mounting means;
   $d_1$—horizontal length between the centroid of $W_1$ and said pivotal means;
   $d_2$—horizontal length between the centroid of $W_2$ and said pivotal means;
   $d_3$—horizontal length between the centroid of $W_3$ and said pivotal means;
   $d_5$—horizontal length between the centroid of $W_5$ and said pivotal means;
   $l$—length along said cover means between the centroid of ($W_3+W_4$) and said mounting means; and
   $m$—length along said cover means between the centroid of ($W_3+W_4$) and said positioning means.

3. Apparatus according to claim 1 and further comprising adjusting means mounted on said carrier means for maintaining said holding means horizontal when said cover means is positioned in said closed position.

4. Apparatus according to claim 1 wherein said pivotal means comprises:
   a bearing connected to said carrier means; and
   an axle connected to the lower surface of said holding means and cooperating with said bearing so that said holding means pivots about said axle.

5. Apparatus according to claim 1 wherein said mounting means comprises:
   a bearing connected to said holding means; and
   an axle connected to said cover means and cooperating with said bearing whereby said cover pivots about said axle between said open and closed positions.

* * * * *

UNITED STATES PATENT AND TRADEMARK OFFICE
CERTIFICATE OF CORRECTION

PATENT NO. : 4,336,984

DATED : June 29, 1982

INVENTOR(S) : Shozi Komatsubara et al.

It is certified that error appears in the above-identified patent and that said Letters Patent is hereby corrected as shown below:

Figures 3 and 4 of the drawings should appear as shown on the attached sheet.

Signed and Sealed this

Twenty-second Day of March 1983

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,336,984

DATED : June 29, 1982

INVENTOR(S) : Shozi Komatsubara et al.

It is certified that error appears in the above—identified patent and that said Letters Patent is hereby corrected as shown below:

FIG.3

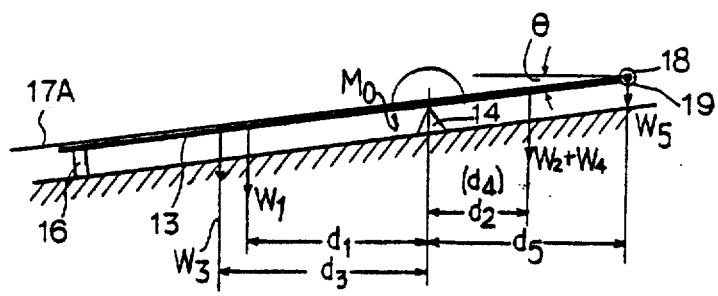

FIG.4